Patented Apr. 12, 1949

2,467,206

UNITED STATES PATENT OFFICE 2,467,206

PREPARATION OF ARYL ESTERS

William F. Gresham and Richard E. Brooks, Wilmington, Del., assignors to E. I. du Pont de Nemours & Company, Wilmington, Del., a corporation of Delaware No Drawing. Application November 19, 1945, Serial No. 629,700

20 Claims. (Cl. 260—497)

This invention relates to the synthesis of organic esters and more particularly to the synthesis of esters by reaction between organic compounds containing olefinic unsaturation, carbon monoxide and phenols.

An object of this invention is to provide a novel method for the high pressure synthesis of esters of organic carboxylic acids in the presence of catalysts which are not excessively corrosive upon the pumps and reaction vessels employed in the process. A further object is to provide a commercially feasible process for the manufacture of aryl esters from readily available and very inexpensive starting materials. Other objects and achievements of the invention will appear hereinafter.

These objects are accomplished in accordance with the invention by reacting an organic compound containing non-aromatic olefinic unsaturation with carbon monoxide and a phenol in the presence of a catalyst containing as an essential or principal ingredient an element of the class consisting of cobalt and nickel under conditions to be hereinafter described. It is to be understood that the element may be present in the free metallic state or may be combined with other substances in the form of alloys or compounds, as, for example, nickel carbonyl or cobalt carbonyl. In a specific embodiment, and by way of illustration, the invention contemplates the synthesis of phenyl propionate in accordance with the following equation in the presence of a catalytic quantity of nickel propionate.

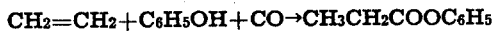

$$CH_2=CH_2 + C_6H_5OH + CO \rightarrow CH_3CH_2COOC_6H_5$$

In other embodiments the invention comprises reacting an organic compound containing non-aromatic olefinic unsaturation with carbon monoxide and a compound of the formula ROH (R representing an aryl group) at elevated temperatures and pressures in the presence of one or more of the aforesaid catalysts, whereby compounds of the formula acyl OR are produced.

It is frequently preferred to carry out the reaction between olefinic compounds, carbon monoxide and phenols in accordance with the invention in the absence of any substantial quantity of free inorganic acidic catalyst, i. e., any inorganic acid other than the aforesaid catalytic salts of nickel or cobalt, which salts may, of course, have an acidic reaction towards indicators. It is thus frequently desirable to employ a metallic catalyst of the class hereinbefore described, or metal carbonyls, or soluble salts thereof, in the absence of inorganic acid catalysts such as hydrogen halides or boron fluoride.

Although combinations of boron fluoride or other acidic catalysts with the metals or metallic compounds herein set forth are operative in the practice of the invention, the advantages of the invention are best realized in the absence of boron fluoride or other similar acidic catalysts.

The unsaturated compounds containing olefinic unsaturation which may be used in accordance with this invention are the olefinic hydrocarbons and other organic compounds containing a (i. e., at least one) non-aromatic double bond between the carbon atoms. Suitable examples of such compounds are the olefinic hydrocarbons themselves, e. g. ethylene, alkyl-substituted ethylenes (such as propylene, butene-2, isobutylene, pentene-1, tetramethyl ethylene, diisobutylene, and cracked gasoline fractions), cyclohexene, butadiene, isoprene, polymerized dienes, styrene, alpha-methyl styrene, vinyl cyclohexene, pinene, limonene, mixed olefins or olefin fractions obtained by cracking and/or dehydrogenation of petroleum, cyclohexadiene, dicyclopentadiene; unsaturated oxygenated compounds such as allyl alcohol, allyl acetate, allyl ethers, methyl allyl alcohol, vinyl acetate, furane, methyl methacrylate, methyl acrylate, methallyl propionate, methyl oleate, oleic acid, methyl vinyl ketone, methyl vinyl ether, cyclohexene carboxylic acids, esters of cyclohexene carboxylic acids, methallyl methacrylate, acrolein; and, in general, the unsaturated hydrocarbons, esters, ethers, carboxylic acids, amides, aldehydes, and ketones containing non-benzenoid olefinic unsaturation. It is sometimes desirable to employ polymerization inhibitors with the readily polymerizable reactants.

The preferred catalysts for use in the practice of the invention are soluble salts of nickel, soluble salts of cobalt, nickel carbonyl, cobalt carbonyl, metallic nickel and metallic cobalt. By "soluble salts" is meant salts which are soluble in one or more of the reactants, or in the reaction medium, under the reaction conditions. The amount of catalyst which may be employed in the practice of the invention may be varied widely but is generally about 0.05% to 30% based on the total weight of the reaction mixture. If desired, the aforesaid catalyst may be employed in combination with inert materials or supports such as charcoal, silica, alumina, kieselguhr, pumice, etc., or promoters, such as $ThO_2$, Mn, etc.

The phenols which may be employed in the practice of the invention include phenol itself, chlorophenol, cresols, xylenols, resorcinols, naphthols, hydroxy derivatives of anthracene, phenanthrene, and the like.

The reaction is preferably conducted by heating the mixture of organic compound containing olefinic unsaturation, carbon monoxide, and phenol, in a suitable pressure-resistant vessel in the presence of one or more of the aforesaid catalysts. The simple olefins such as ethylene generally do not require as high a pressure as is required by the highly branched olefins, such as tetramethyl ethylene. In general, however, the pressure should be within the range of about 50 to 3,000 atmospheres, or even higher, the maximum pressure being limited only by the strength of the retaining vessel. The simple olefinic hydrocarbons, particularly ethylene and propylene, may be reacted, according to the invention, very satisfactorily at pressure within the range of about 200 to 1500 atmospheres. Pressures exceeding 1000 atmospheres are frequenty required for the highly branched olefinic compounds.

In certain instances, oxygen-containing compounds other than aryl esters may be produced in the reaction between olefinic compounds, carbon monoxide and phenols. However, as set forth in the examples, the yield of aryl esters may be as high as about 85% to 90%.

The reaction between the olefinic compound, carbon monoxide, and phenol may be conducted either batchwise or continuously. When solid catalysts are employed they may be used in the form of a fixed bed or they may be conducted through the reaction vessel along with the reactants. Alternatively, solid catalysts may be employed in a finely divided fluidized state, or they may be suspended in the reaction mixture. The reaction may be conducted either in the liquid or the vapor phase.

The relative proportions of reactants employed may be the stoichiometrically required quantities, although other proportions may be employed if desired. Excellent results are obtained when the mole ratio of olefinic compound:CO:phenol is about 1:1:1 to about 1:20:1. When a high proportion of carbon monoxide is employed the reaction evidently takes place largely in the vapor phase.

If desired, any inert liquid may be employed as a reaction medium. However, the reaction may be conducted satisfactorily in the absence of any added medium. Examples of suitable inert organic solvents which may be employed as reaction media are esters, cyclohexane, xylene, benzene, saturated hydrocarbons and the like.

The invention is illustrated further by means of the following examples.

*Example 1.*—A mixture containing 47.1 grams of phenol, 100 grams of benzene, 10 grams of nickel propionate and 28 grams of ethylene was heated in a copper lined, pressure-resistant reaction vessel at a temperature of 292° to 300° C. for 25 minutes under a pressure of 260 to 700 atmospheres of carbon monoxide. The resulting product was distilled, giving an 87.3% yield of phenyl propionate, which had a boiling point of 78° to 80° C. at 8 mm.

*Example 2.*—A mixture containing 47.1 grams of phenol, 100 grams of benzene, 10 grams of nickel carbonyl, and 28 grams of ethylene was heated at a temperature of 285° to 318° C. for 45 minutes under a pressure of 550 to 805 atmospheres of carbon monoxide. A 70% conversion to phenyl propionate was obtained.

Repetition of the experiment with propylene in place of ethylene gives a good yield of phenyl butyrate.

*Example 3.*—A mixture containing 54.1 grams of o-cresol, 100 grams of benzene, 10 grams of nickel carbonyl and 28 grams of ethylene was heated at a temperature of 295° to 310° C. for 45 minutes under a pressure of 600 to 805 atmospheres of carbon monoxide. Conversion to o-tolyl propionate (B. P. 73° to 83° C. at 4.5 to 5 mm.) was 82%.

Repetition of the experiment with cobalt carbonyl in place of nickel carbonyl gives o-tolyl propionate.

*Example 4.*—A mixture containing 38.6 grams of m-chlorophenol, 100 grams of benzene, 10 grams of nickel carbonyl and 28 grams of ethylene was heated at a temperature of 290° to 326° C. for 28 minutes under a pressure of 350 to 700 atmospheres of carbon monoxide. Distillation of the resulting product gave a 34.6% conversion to a fraction which was identified as m-chlorophenyl propionate, (B. P., 64° to 66° C. at 3 mm.).

*Example 5.*—A mixture containing 27.5 grams of resorcinol, 100 grams of benzene, 10 grams of nickel carbonyl and 28 grams of ethylene was heated at a temperature of 280° to 306° C. for 30 minutes under a pressure of 450 to 705 atmospheres of carbon monoxide. Conversion to resorcinol di-propionate (B. P., 117° to 110° C. at 4 mm.) was 88.4%.

*Example 6.*—A mixture containing 32.1 grams of p-tertiary butyl phenol, 100 grams of benzene, 10 grams of nickel carbonyl and 28 grams of ethylene was heated at a temperature of 315° to 324° C. for 32 minutes under a pressure of 600 to 700 atmospheres of carbon monoxide. A 72% conversion to p-tertiary butyl phenyl propionate (B. P., 107° to 108° C. at 5 mm.) was obtained.

*Example 7.*—A mixture containing 34.2 grams of beta-naphthol, 100 grams of benzene, 10 grams of nickel carbonyl and 28 grams of ethylene was heated for 20 minutes at a temperature of 325° to 333° C. under a pressure of 590 to 700 atmospheres of carbon monoxide. Distillation of the resulting product gave as a main fraction a distillate (B. P., 147° C. at 4 mm. to 153° C. at 5 mm.) which corresponded to a 67.7% conversion to beta-naphthyl propionate.

*Example 8.*—A mixture containing 61.1 grams of 3,5-dimethylphenol, 100 grams of benzene, 10 grams of nickel carbonyl and 28 grams of ethylene was heated at a temperature of 305° to 320° C. for 45 minutes under a carbon monoxide pressure of 600 to 755 atmospheres. Distillation of the resulting product gave a 45.9% conversion to 3,5-dimethylphenyl propionate (B. P. 72° to 80° C. at 3 mm.).

*Example 9.*—A mixture containing 47.1 grams of phenol, 56.1 grams of isobutylene, 75 grams of benzene and 10 grams of nickel carbonyl was heated at a temperature of 310° to 325° C. for 90 minutes under a carbon monoxide pressure of 605 to 705 atmospheres. A 10% conversion to phenyl valerate was obtained.

*Example 10.*—A mixture of 47.1 grams of phenol, 100 grams of benzene, 5 grams of a metallic cobalt catalyst and 28 grams of ethylene was heated at a temperature of 275° to 300° C. for 64 minutes under a pressure of 660 to 895 atmospheres of carbon monoxide. Distillation of the resulting product gave a fraction boiling in the range 68° at 10 mm. pressure to 128° at 2 mm. pressure which by analysis contained an ester and other oxygenated compounds.

In certain instances the nature of the reaction product depends upon the temperature at which the reaction is conducted. High temperatures and pressures may, in many instances, lead to the formation of miscellaneous oxygen-containing products rather than to higher yields of aryl esters. In general, however, it is preferred to operate at a temperature within the range of 150° to 500° C., preferably about 175° to 375° C.

In general, in practicing the invention the catalyst may be recovered and reused. Thus, if nickel carbonyl is employed, it can be recovered from the reaction product by distillation under a blanket of carbon monoxide.

When the reaction between organic olefinic compounds, carbon monoxide and phenol is conducted in the presence of soluble catalysts in a continuous manner, tubular converters may be employed. In the continuous process the reactants may be introduced at one or more points within the reaction vessel, if desired. In certain instances it is preferred to employ a tubular reaction vessel in which the temperature and pressure are not uniform throughout the length of the vessel.

The reaction vessel employed in the practice of the invention may be made of, or lined with, inert materials such as glass, porcelain, and the like, if desired. In preferred embodiments the reaction vessel is made of or lined with metals which do not exert an appreciable catalytic effect upon the reaction. Excellent results may be obtained in reaction vessels lined with copper, silver or other relatively inert metals.

In the following claims, it is to be understood that where reference is made to the elements, nickel and/or cobalt, they may be present in the free metallic state or may be combined with other substances in the form of alloys or compounds.

The products obtained in accordance with the invention are widely useful per se, and are also valuable as intermediates for the manufacture of acids, esters, amides and numerous other organic materials.

Since many embodiments of the invention may be made without departing from the spirit and scope thereof, we do not limit ourselves except as set forth in the following claims.

We claim:

1. A process for the synthesis of esters which comprises heating an organic compound containing non-aromatic olefinic unsaturation with carbon monoxide and a phenol at a temperature within the range of 150° to 500° C. under a pressure within the range of 50 to 3000 atmospheres in the presence of a catalyst containing an element of the class consisting of nickel and cobalt, whereby an ester of the formula acyl OR, R representing the aryl group attached to phenolic hydroxyl in the said phenol is produced, and separating from the resultant reaction product the said ester of the formula acyl OR formed by the ensuing reaction between the said phenol, carbon monoxide and organic compound containing non-aromatic olefinic unsaturation.

2. A process for the synthesis of esters which comprises heating an organic compound containing non-aromatic olefinic unsaturation with carbon monoxide and phenol at a temperature within the range of 150° to 500° C. under a pressure within the range of 50 to 3000 atmospheres in the presence of a catalyst containing an element of the class consisting of nickel and cobalt, whereby an ester of the formula acyl $OC_6H_5$ is produced, and separating from the resultant reaction product the ester of the formula acyl $OC_6H_5$ formed by the ensuing reaction between the said phenol, carbon monoxide and organic compound containing aromatic olefinic unsaturation.

3. A process for the synthesis of esters which comprises heating an organic compound containing non-aromatic olefinic unsaturation with carbon monoxide and a cresol at a temperature within the range of 150° to 500° C. under a pressure within the range of 50 to 3000 atmospheres in the presence of a catalyst containing an element of the class consisting of nickel and cobalt, in the absence of an inorganic acidic catalyst, and separating from the resultant reaction product the ester produced by the ensuing reaction between the said cresol, carbon monoxide and aromatic compound containing non-aromatic olefinic unsaturation.

4. A process for the synthesis of esters which comprises heating an organic compound containing non-aromatic olefinic unsaturation with carbon monoxide and a naphthol at a temperature within the range of 150° to 500° C. under a pressure within the range of 50 to 3000 atmospheres in the presence of a catalyst containing an element of the class consisting of nickel and cobalt, in the absence of an inorganic acidic catalyst, and separating from the resultant reaction product the ester produced by the ensuing reaction between the said naphthol, carbon monoxide and aromatic compound containing non-aromatic olefinic unsaturation.

5. A process for the synthesis of esters which comprises heating ethylene with carbon monoxide and a phenol at a temperature within the range of 150° to 500° C. under a pressure within the range of 50 to 3000 atmospheres in the presence of a catalyst containing an element of the class consisting of nickel and cobalt, in the absence of an inorganic acidic catalyst, and separating from the resultant reaction product the ester produced by the ensuing reaction between the said phenol, carbon monoxide and ethylene.

6. A process for the synthesis of esters which comprises heating isobutylene with carbon monoxide and a phenol at a temperature within the range of 150° to 500° C. under a pressure within the range of 50 to 3000 atmospheres in the presence of a catalyst containing an element of the class consisting of nickel and cobalt, in the absence of an inorganic acidic catalyst, and separating from the resultant reaction product the ester produced by the ensuing reaction between the said phenol, carbon monoxide and isobutylene.

7. A process for the synthesis of esters which comprises heating propylene with carbon monoxide and a phenol at a temperature within the range of 150° to 500° C. under a pressure within the range of 50 to 3000 atmospheres in the presence of a catalyst containing an element of the class consisting of nickel and cobalt, in the absence of an inorganic acidic catalyst, and separating from the resultant reaction product the ester produced by the ensuing reaction between the said phenol, carbon monoxide and propylene.

8. A process for the synthesis of esters which comprises heating an organic compound containing non-aromatic olefinic unsaturation with carbon monoxide and a phenol at a temperature within the range of 150° to 500° C. under a pressure within the range of 50 to 3000 atmospheres in the presence of nickel carbonyl, in the absence of an inorganic acidic catalyst, and separating from the resultant reaction product the ester produced by the ensuing reaction between the said phenol, carbon monoxide and an organic compound containing non-aromatic olefinic unsaturation.

9. A process for the synthesis of oxygen-containing organic compounds which comprises heating an organic compound containing non-aromatic olefinic unsaturation with carbon monoxide and a phenol at a temperature within the range of 150° to 500° C. under a pressure within the range of 50 to 3000 atmospheres, in the presence of cobalt carbonyl, in the absence of an inorganic acidic catalyst, and separating from the resultant reaction product the oxygen-containing organic compounds produced by the ensuing reaction between the said phenol, carbon monoxide and organic compound containing non-aromatic olefinic unsaturation.

10. A process for the synthesis of esters which comprises heating an organic compound containing non-aromatic olefinic unsaturation with carbon monoxide and a phenol at a temperature within the range of 150° to 500° C. under a pressure within the range of 50 to 3000 atmospheres in the presence of nickel propionate, and separating from the resultant reaction product the ester produced by the ensuing reaction between the said phenol, carbon monoxide and an organic compound containing non-aromatic olefinic unsaturation.

11. A process for the synthesis of esters which comprises heating an organic compound containing non-aromatic olefinic unsaturation with carbon monoxide and a phenol at a temperature within the range of 175° to 375° C. under a pressure within the range of 200 to 1500 atmospheres in the presence of a catalyst containing as an essential ingredient an element of the class consisting of nickel and cobalt in the absence of an inorganic acidic catalyst, and separating from the resultant reaction product the ester produced by the ensuing reaction between the said phenol, carbon monoxide and an organic compound containing non-aromatic olefinic unsaturation.

12. A process for the synthesis of esters which comprises heating an organic compound containing non-aromatic olefinic unsaturation with carbon monoxide and phenol at a temperature within the range of 175° to 375° C. under a pressure within the range of 200 to 1500 atmospheres in the presence of a catalyst containing as an essential ingredient an element of the class consisting of nickel and cobalt in the absence of an inorganic acidic catalyst, and separating from the resultant reaction product the ester produced by the ensuing reaction between the said phenol, carbon monoxide and an organic compound containing non-aromatic olefinic unsaturation.

13. A process for the synthesis of esters which comprises heating an organic compound containing non-aromatic olefinic unsaturation with carbon monoxide and a cresol at a temperature within the range of 175° to 375° C. under a pressure within the range of 200 to 1500 atmospheres in the presence of a catalyst containing as an essential ingredient an element of the class consisting of nickel and cobalt in the absence of an inorganic acidic catalyst, and separating from the resultant reaction product the ester produced by the ensuing reaction between the said cresol, carbon monoxide and organic compound containing non-aromatic olefinic unsaturation.

14. A process for the synthesis of esters which comprises heating an organic compound containing non-aromatic olefinic unsaturation with carbon monoxide and a naphthol at a temperature within the range of 175° to 375° C. under a pressure within the range of 200 to 1500 atmospheres in the presence of a catalyst containing as an essential ingredient an element of the class consisting of nickel and cobalt in the absence of an inorganic acidic catalyst, and separating from the resultant reaction product the ester produced by the ensuing reaction between the said naphthol, carbon monoxide and organic compound containing non-aromatic olefinic unsaturation.

15. A process for the synthesis of esters which comprises heating ethylene with carbon monoxide and a phenol at a temperature within the range of 175° to 375° C. under a pressure within the range of 200 to 1500 atmospheres in the presence of a catalyst containing as an essential ingredient an element of the class consisting of nickel and cobalt in the absence of an inorganic acidic catalyst, and separating from the resultant reaction product the ester produced by the ensuing reaction between the said phenol, carbon monoxide and ethylene.

16. A process for the synthesis of esters which comprises heating isobutylene with carbon monoxide and a phenol at a temperature within the range of 175° to 375° C. under a pressure within the range of 200 to 1500 atmospheres in the presence of a catalyst containing as an essential ingredient an element of the class consisting of nickel and cobalt in the absence of an inorganic acidic catalyst, and separating from the resultant reaction product the ester produced by the ensuing reaction between the said phenol, carbon monoxide and isobutylene.

17. A process for the synthesis of esters which comprises heating propylene with carbon monoxide and a phenol at a temperature within the range of 175° to 375° C. under a pressure within the range of 200 to 1500 atmospheres in the presence of a catalyst containing as an essential ingredient an element of the class consisting of nickel and cobalt in the absence of an inorganic acidic catalyst, and separating from the resultant reaction product the ester produced by the ensuing reaction between said phenol, carbon monoxide and propylene.

18. A process for the synthesis of esters which comprises heating an organic compound containing non-aromatic olefinic unsaturation with carbon monoxide and a phenol at a temperature within the range of 175° to 375° C. under a pressure within the range of 200 to 1500 atmospheres in the presence of nickel carbonyl and in the absence of an inorganic acidic catalist, and separating from the resultant reaction product the ester produced by the ensuing reaction between the said phenol, carbon monoxide and an organic compound containing non-aromatic olefinic unsaturation.

19. A process for the synthesis of oxygen-containing organic compounds which comprises heating an organic compound containing non-aromatic olefinic unsaturation with carbon monoxide and a phenol at a temperature within the range of 175° to 375° C. under a pressure within the range of 200 to 1500 atmospheres in the presence of cobalt carbonyl and in the absence of an inorganic acidic catalyst, and separating from the resultant reaction product the oxygen-containing organic compounds produced by the ensuing reaction between the said phenol, carbon monoxide and organic compound containing non-aromatic olefinic unsaturation.

20. A process for the synthesis of esters which comprises heating an organic compound containing non-aromatic olefinic unsaturation with carbon monoxide and a phenol at a temperature within the range of 175° to 375° C. under a pressure within the range of 200 to 1500 atmospheres in the presence of nickel proprionate and in the absence of an inorganic acidic catalyst, and separating from the resultant reaction product the ester produced by the ensuing reaction between the said phenol, carbon monoxide and an organic compound containing non-aromatic olefinic unsaturation.

WILLIAM F. GRESHAM.
RICHARD E. BROOKS.

REFERENCES CITED

The following references are of record in the file of this patent:

UNITED STATES PATENTS

| Number | Name | Date |
| --- | --- | --- |
| 1,924,763 | Carpenter (I) | Aug. 29, 1933 |
| 1,957,939 | Carpenter (II) | May 8, 1934 |
| 1,979,717 | Vail | Nov. 6, 1934 |
| 2,158,031 | Loder | May 9, 1939 |
| 2,414,999 | Bearse et al. | Jan. 28, 1947 |